United States Patent [19]

Castagna

[11] Patent Number: 4,602,175
[45] Date of Patent: Jul. 22, 1986

[54] DAMPED COIL CONSTRUCTION FOR VCM

[75] Inventor: Joseph T. Castagna, San Jose, Calif.

[73] Assignee: International Business Machines Corporation, Armonk, N.Y.

[21] Appl. No.: 470,655

[22] Filed: Feb. 28, 1983

[51] Int. Cl.⁴ .............................................. H02K 41/02
[52] U.S. Cl. ...................................... 310/13; 310/27; 336/208
[58] Field of Search .............................. 310/13, 27, 12; 336/208

[56] References Cited

U.S. PATENT DOCUMENTS

| | | | |
|---|---|---|---|
| 3,194,992 | 7/1965 | Brown | 310/27 |
| 3,484,628 | 12/1969 | Barna | 310/13 |
| 4,053,975 | 10/1977 | Olbrich | 310/134 |
| 4,144,466 | 3/1979 | Hatch | 310/13 |

FOREIGN PATENT DOCUMENTS 453256  9/1936  United Kingdom ................. 310/27

Primary Examiner—Donovan F. Duggan
Attorney, Agent, or Firm—Richard E. Cummins; Thomas R. Berthold

[57] ABSTRACT

A coil for a voice coil actuator employed in a transducer positioning system of a disk file is disclosed in which the coil is constructed to minimize vibrations in a direction parallel to the coil axis which tend to occur as a result of rapidly energizing the coil during the seek and track following modes of the positioning system. The coil is characterized by a composite layer of viscoelastic material and aluminum foil disposed between the coil bobbin and the coil winding where the aluminum foil functions to increase the shear deformation of the viscoelastic material and its modulus of rigidity.

4 Claims, 3 Drawing Figures

DAMPED COIL CONSTRUCTION FOR VCM

DESCRIPTION

BACKGROUND OF THE INVENTION

1. Field of the Invention

This invention relates in general to voice coil actuators and, in particular, to an improved coil construction and construction method which reduces vibration in the coil of the voice coil actuator.

2. Description of the Prior Art

Disk files are used extensively in data processing systems to store data on a rotating magnetic disk at a particular address. The disk generally has a plurality of concentric recording tracks which are numbered so that the address of the data involves at least a track number and sometimes a disk number where the file includes more than one disk or recording surface. The data address is supplied to a transducer positioning system which has the function of positioning a magnetic transducer to the center of the addressed track.

In order to increase data storage capacity of the disk surface, the center-to-center spacing between adjacent disk tracks has been decreased to the point where track densities currently are in the range of 800 to 1000 tracks per inch. At these densities, the transducer positioning system must, of necessity, be of the track following type in order to maintain the transducer centered on the track throughout the entire revolution of the disk. Track following servo positioning systems operate by sensing a prerecorded servo pattern which has been placed on another surface or interleaved with data on the track. The sensing of the servo pattern is achieved by either a separate servo transducer which is moved conjointly with the data heads or, in some systems, by the data head itself. Variations of the servo head from the center of the track are converted to position error signals that are supplied to the voice coil actuator and function to correct the position error and move the heads back over the center of the track.

It will, therefore, be appreciated by persons skilled in the art that since the servo transducer is moved by the coil of the VCM, it is important to insure that spurious movement of the head relative to the servo pattern does not occur, especially where the spurious movements are cyclic and at a frequency which is outside the range of frequency correctable by the servo system. Considerable effort is, therefore, taken to insure that the components of the system are designed to avoid vibrations, particularly those frequencies which correspond to natural resonances that might occur as the coil is energized by the position error signals during the track following situation and during the track positioning operation.

Analysis of the dynamic performance of positioning systems employed in current commercial disk files indicates that a major source of vibration in the file is the coil of the VCM. The coil assembly must, of necessity, be rigidly attached to the head arms and to the movable carriage in order to obtain positioning accuracy and repeatability.

The coil assembly generally has a tendency to vibrate and resonate in a longitudinal direction parallel to the coil axis when energized. Various arrangements have been suggested in the prior art to minimize this tendency. See, for example, U.S. Pat. No. 4,144,466 assigned to the assignee of the present invention and the prior art referenced in that patent.

In order to increase the track density and obtain even greater storage capacity of the data in the disk, it is desirable and often times necessary to further decrease the amplitude of longitudinal resonance vibrations in the actuator upon energization of the coil. In the past, this has generally required a complete redesign of the various mechanical components of the positioning system along with considerable modelling and testing to minimize vibration problems.

The present invention is directed to a coil construction and construction method which does not require a redesign of the basic mechanical hardware of the system in order to achieve a reduction in longitudinal vibration resonances in the actuator.

SUMMARY OF THE INVENTION

In accordance with the present invention, the voice coil is provided with a layer of viscoelastic damping material, i.e., a composite layer of damping material and an aluminum layer, wrapped on the coil bobbin prior to winding of the coil wire on the bobbin. The composite layer is slit to correspond to the axially extending slit normally provided in the bobbin to prevent or reduce eddy currents. The composite layer of damping material and aluminum layer function as an energy dissipating device in shear only, i.e., parallel to the direction of motion of the coil. The coil is not isolated from the actuator as in many prior art arrangements which attempt to reduce horizontal vibrations. The aluminum layer functions to constrain the viscoelastic material which increases its shear deformation, and the modulus of rigidity of the damping material is also increased. The ability of the material to dissipate energy is, therefore, increased along with overall damping losses.

The aluminum layer also functions as a support for the coil wire as it is being wound on the bobbin. Since the aluminum layer, in effect, covers the viscoelastic material, the aluminum layer serves also as a seal to prevent possible contamination from entering the environment of the head disk interface and adversely affect the transducing operation. The aluminum layer also acts to keep any potential chemical reactions between the viscoelastic material and wire insulation from occurring.

It is, therefore, an object of the present invention to provide an improved coil construction for the coil of a voice coil motor employed in the transducer positioning system of a magnetic disk file.

Another object of the present invention is to provide an improved method of constructing a coil of a voice coil motor to decrease vibrations in a direction parallel to the coil axis.

The foregoing and other objects, features and advantages of the invention will be apparent from the following more particular description of a preferred embodiment of the invention as illustrated in the accompanying drawing.

DESCRIPTION OF THE PREFERRED EMBODIMENT

Figure 1:
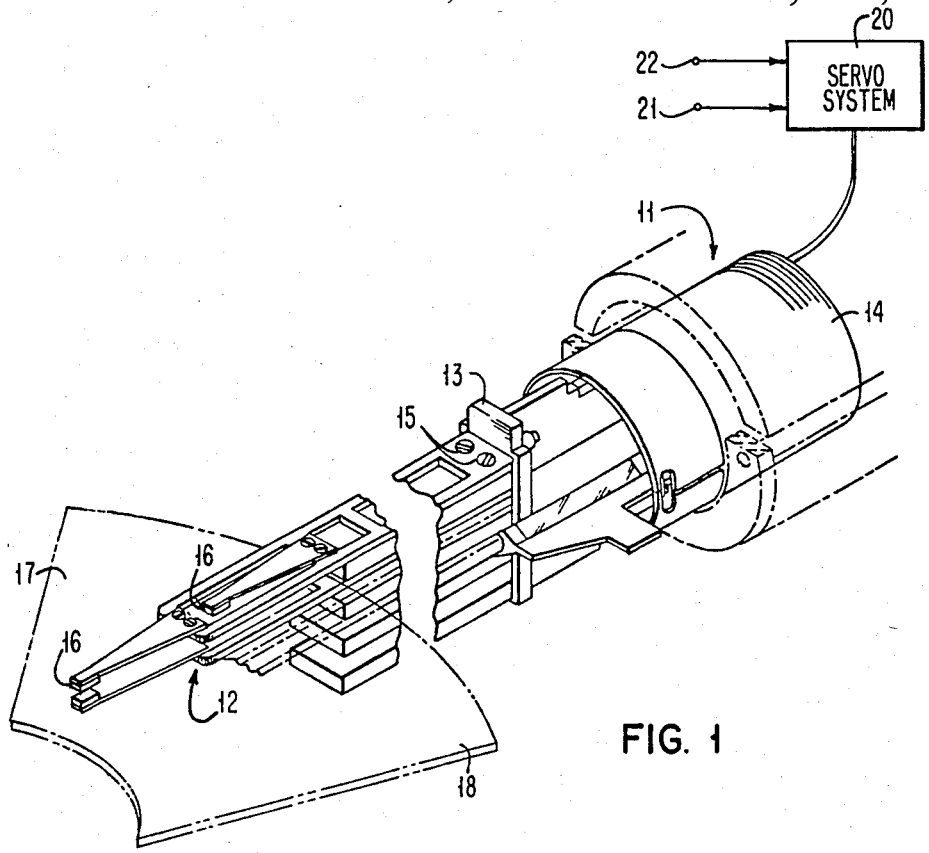
FIG. 1 is a perspective view of prior art transducer positioning system employing a voice coil motor.

FIG. 1 illustrates the mechanical components of a voice coil actuator transducer positioning system and is representative of prior art voice coil actuators in which the present invention may be advantageously employed. The assembly shown in FIG. 1 comprises generally the voice coil actuator 11, a group of head arm members 12, and a T-block member 13 which functions to mount the head arm members 12 for movement by the coil 14. As shown, a plurality of head arm members 12 are suitably attached to block 13 by screws 15. Each head arm member 12 carries a pair of magnetic transducers or heads 16 which cooperate with one surface 17 of a disk 18, only one of which is shown in FIG. 1. T-block 13 is supported by a suitable bearing system (not shown) which guides the movement of the block 13 and head 16 along a path which corresponds substantially to a radius of disk 18.

Coil 14 of the actuator 11 is energized from a suitable electronic servo system 20 which functions to position the transducer from one track to another in response to an address signal supplied to terminal 21 of servo system 20. Servo system 20 also functions to maintain the transducer on the center of the addressed track (track follow) in response to signals from a servo transducer supplied to terminal 21. When signals are applied to coil 14, the coil moves in a direction depending on the polarity of the signal and at a velocity depending on the magnitude of the signal. Since average access times for state of the art transducer positioning systems are in the range of 15 to 30 milliseconds, very rapid acceleration and deceleration forces are involved which tend to cause resonant vibration of the elements of the system. The forces involved are developed in the coil winding per se as a result of flux in the air gap of the voice coil motor. These forces are generally in the axial direction and tend to develop resonant vibrations along the horizontal axis of the assembly shown in FIG. 1. The manner in which the coil is attached to the coil bobbin determines, to a large extent, the position accuracy of the overall system and its tendency to vibrate or resonate along the horizontal axis.

Figure 2:
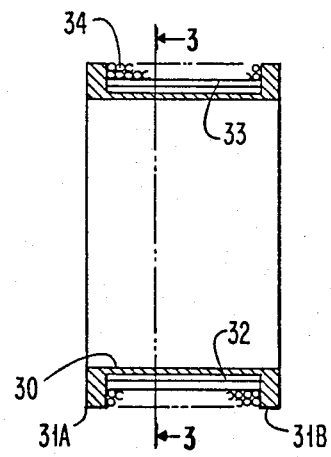
FIG. 2 is a sectional view of a voice coil embodying the present invention.
Figure 3:
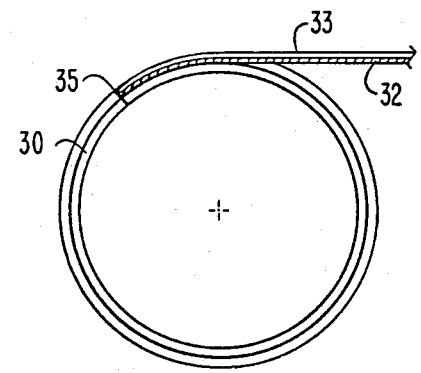
FIG. 3 is a schematic illustration of the improved method for constructing the voice coil shown in FIG. 2.

FIG. 2 illustrates the cross-section of the coil of a voice coil motor embodying the present invention, while FIG. 3 shows how the improved coil of FIG. 2 may be constructed.

As shown in FIG. 2, the coil comprises a cylindrical bobbin member 30, a pair of coil ring elements 31A and 31B, a composite layer of viscoelastic material 32 and an aluminum layer 33, and, finally, the coil winding 34.

The composite layer of viscoelastic material 32 and aluminum layer 33 is applied to the bobbin as shown in FIG. 3. The composite layer is in the form of a self-adhesive tape which will adhere to the coil bobbin 30 and will be permanently bonded thereto during the normal coil baking process. The thickness of the composite layer is in the range of 5 to 10 mils. with the viscoelastic material being in the order of twice the thickness of the aluminum layer 33. One layer of the composite material 32 is applied to the bobbin, and then the composite layer is slit at 35 similar to the coil bobbin to minimize the effect of eddy currents on the operation of the actuator.

The aluminum layer 33 provides a firm base for machine winding of the coil which is subsequently fixed relative to the bobbin by suitable means. Along with the coil rings 31A and 31B, aluminum layer 33 tends to seal the viscoelastic material 32 so as to avoid subjecting this material to any adverse environments during the assembly process. The viscoelastic material may be any of the known viscoelastic materials such as the material marketed by 3M Company under the trademark "Scotchdamp" which employs proprietary viscoelastic polymer materials referred to as either type 110 or type 112.

While the invention has been particularly shown and described with reference to a preferred embodiment thereof, it will be understood by those skilled in the art that various changes in the form and details may be made therein without departing from the spirit and scope of the invention.

Having thus described my invention, what I claim as new and desire to secure by Letters Patent is:

1. In a voice coil actuator for positioning magnetic heads in a disk file, an improved coil comprising:
    (a) a cylindrical bobbin including a pair of end rings disposed on opposite ends of said bobbin, the bobbin and end rings thereby defining a cylindrically shaped channel;
    (b) a cylindrical layer of viscoelastic material disposed in said channel with one self-adhesive surface in bonded contact with the surface of said bobbin corresponding to the bottom of said channel;
    (c) a cylindrical layer of aluminum foil surrounding said layer of viscoelastic material for constraining said material in said channel; and
    (d) a coil winding surrounding said layer of aluminum foil.

2. The improved coil recited in claim 1 in which said layer of viscoelastic material and said layer of aluminum foil comprise a composite multilayer member.

3. The improved coil recited in claim 2 in which said layers and said bobbin are slit parallel to the coil axis to minimize eddy currents.

4. The improved coil recited in claim 1 further including means for maintaining said coil winding in fixed relationship to said bobbin.

* * * * *